United States Patent [19]

Orain

[11] Patent Number: 4,504,245
[45] Date of Patent: Mar. 12, 1985

[54] TELESCOPIC COUPLING EMPLOYING ROLLERS AND APPLICATIONS THEREOF

[75] Inventor: Michel A. Orain, Conflans Sainte Honorine, France

[73] Assignee: Glaenzer Spicer, Poissy, France

[21] Appl. No.: 585,033

[22] Filed: Mar. 6, 1984

Related U.S. Application Data

[63] Continuation of Ser. No. 338,956, Jan. 12, 1982, abandoned.

[30] Foreign Application Priority Data

Jan. 16, 1981 [FR] France ............................ 81 00732

[51] Int. Cl.³ .............................................. F16D 3/06
[52] U.S. Cl. ..................................... 464/167; 464/170
[58] Field of Search .......................... 403/23, 50, 51; 464/111, 120, 123, 132, 162, 167, 170, 173, 175

[56] References Cited

U.S. PATENT DOCUMENTS

| 2,926,510 | 3/1960 | DeLorean | 464/123 |
| 2,927,444 | 3/1960 | Wildhaber | 464/173 X |
| 3,008,311 | 11/1961 | Mazziotti | 464/123 |
| 3,204,427 | 9/1965 | Dunn | 464/175 X |
| 3,797,276 | 3/1974 | Orain | 464/167 |
| 4,196,598 | 4/1980 | Hirai et al. | 464/111 |
| 4,224,806 | 9/1980 | Kobayashi | 464/111 |

FOREIGN PATENT DOCUMENTS

| 234387 | 12/1959 | Australia | 464/167 |
| 34073 | 8/1981 | European Pat. Off. | 464/111 |
| 962842 | 4/1957 | Fed. Rep. of Germany | 464/162 |
| 2169475 | 9/1973 | France . | |
| 1231174 | 5/1971 | United Kingdom . | |

Primary Examiner—John M. Jillions
Assistant Examiner—Daniel P. Stodola
Attorney, Agent, or Firm—Wenderoth, Lind & Ponack

ABSTRACT

The object of the invention is to achieve a reduced cost, great lightness and possibility of mass-production of the coupling while of course retaining the qualities of a very free sliding, reliability and long life. Such qualities should in particular permit an application of the coupling in the automobile industry. The coupling is of the type comprising a cylindrical tubular sleeve which has generatrices parallel to the direction of sliding and which is intended to be fixed to one of two elements to be coupled. The sleeve defines at least two runways for at least two rollers rotatively mounted on trunnions rigid with a rod which is intended to be fixed to the other of the elements to be coupled. At the end of the sleeve opposed to the end fixed to the element to be coupled, there is provided a cover which is fixed to the sleeve by an elastically yieldable fastener. The cover defines a surface perpendicular to the axis and abutting, with interposition of a sealing element, against the adjacent end of the sleeve. This cover defines a device for guiding and sealing the rod.

10 Claims, 5 Drawing Figures

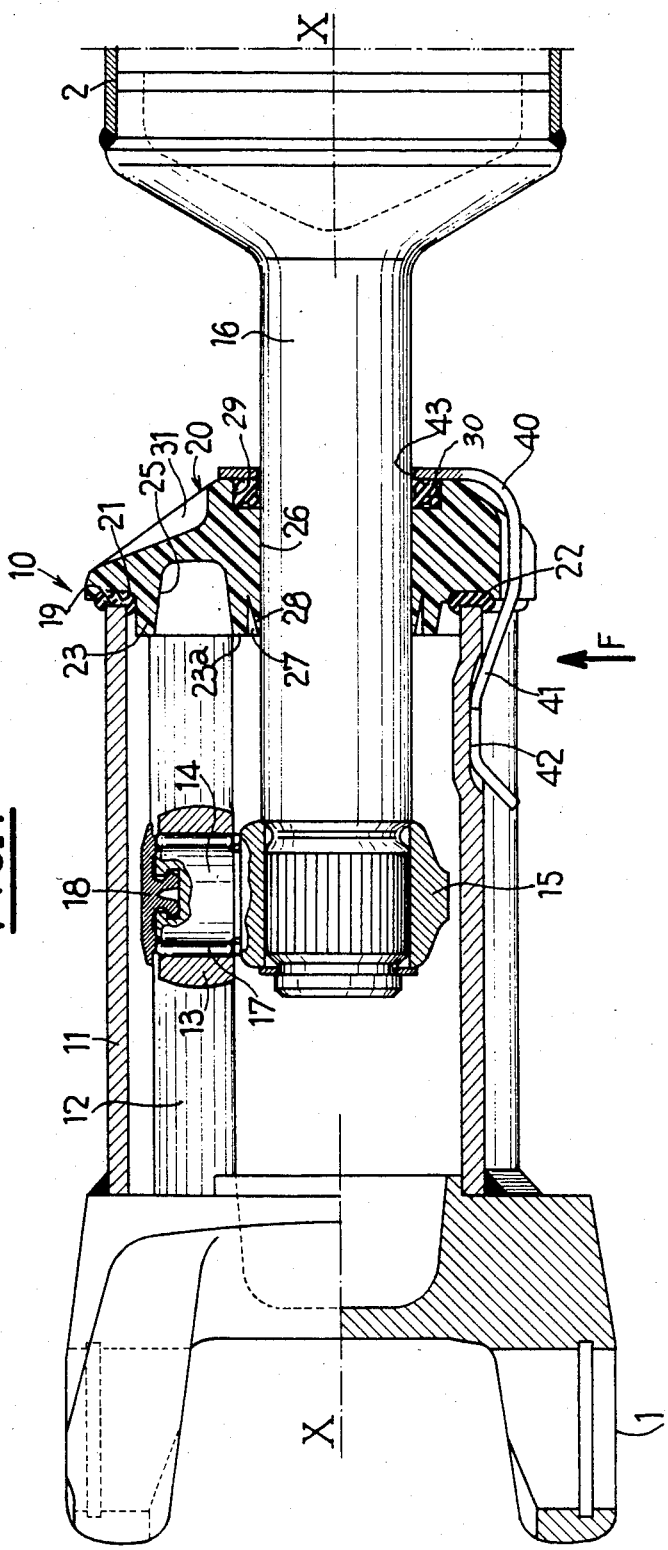
FIG_1
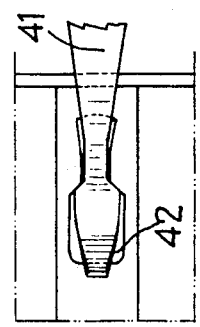
FIG_2
U.S. Patent Mar. 12, 1985 Sheet 1 of 2 4,504,245

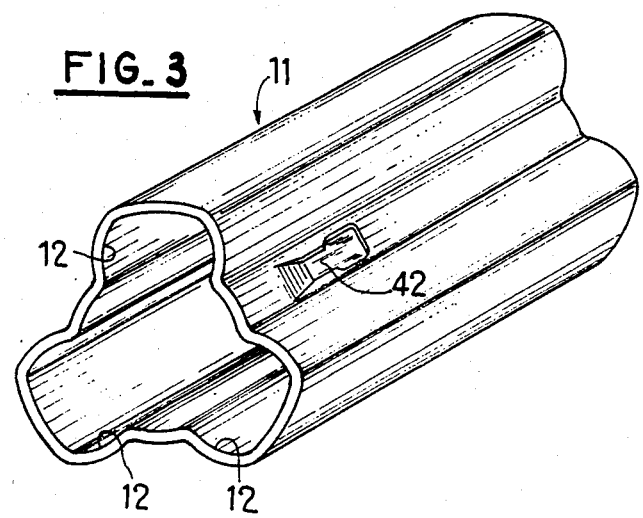
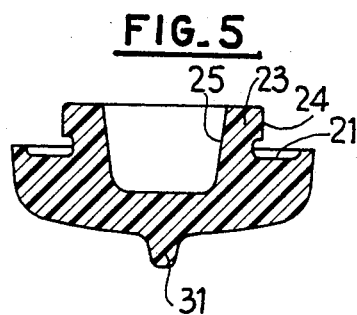
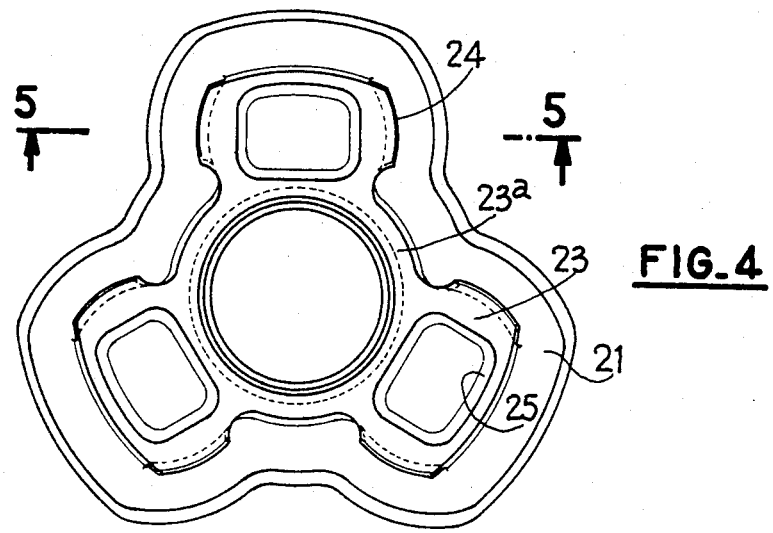

TELESCOPIC COUPLING EMPLOYING ROLLERS AND APPLICATIONS THEREOF

This application is a continuation of now abandoned application Ser. No. 338,956, filed Jan. 12, 1982.

BACKGROUND OF THE INVENTION

The present invention relates to telescopic couplings employing rollers for interconnecting two aligned rotary elements which may undergo a relative movement of translation parallel to their common axis. Such a coupling is of the type comprising a cylindrical tubular sleeve which has generatrices parallel to the direction of sliding and which is adapted to be fixed to one of the two elements to be interconnected, said sleeve defining at least two runways for at least two rollers rotatively mounted on trunnions rigid with a rod which is adapted to be fixed to the other of said elements. An example thereof is disclosed in French Pat. No. 2,169,475 filed on Jan. 26, 1972 by the same firm.

Such couplings are employed in particular in transmission shafts which are driven in rotation under torque and must allow a certain variation in length while opposing a resistance which is as low as possible. A coupling device employing rollers has the advantage over conventional arrangements of splined couplings of opposing a much lower resistance to the sliding, for example of the order of 1/50th of that of the best sliding splined devices.

SUMMARY OF THE INVENTION

With respect to the embodiment disclosed in the aforementioned patent, the object of the invention is to achieve a reduction in the cost, greater lightness and a possibility of mass-production while of course the same qualities of a very free sliding, reliability and long life are retained. Such qualities should in particular permit an application of the coupling in the automobile industry.

The invention consequently provides a coupling employing rollers of the above-defined type, wherein the sleeve carries at the end thereof opposed to the element to which it is fixed a cover which is secured to the sleeve by an elastically yieldable fastener, said cover defining a surface perpendicular to the axis of the coupling and abutting, with interposition of a sealing element, against the adjacent end of the sleeve, said cover defining means for guiding and sealing the rod carrying the rollers.

According to other features of the invention:

the sleeve is preferably produced from forged or extended tube cut out to length and then broached and treated in the region of the runways;

the cover is moulded from a plastics material;

the cover has portions which project from the inner surface thereof and cooperate with the runways of the sleeve for the purpose of centering the cover relative to the latter;

said projecting portions are hollowed out for receiving a part of the rollers at the end of the extension travel;

the cover includes an abutment for the end of the extension travel which cooperates with an abutment surface rigid with the rod;

the cover includes a notched annular flange defining a sealing lip for the rod.

Another object of the invention is to provide a transmission shaft, in particular for an automobile vehicle, which comprises a coupling such as that defined hereinbefore.

BRIEF DESCRIPTION OF THE DRAWINGS

The invention will be described in more detail hereinafter with reference to the accompanying drawings which are given solely by way of example and in which:

FIG. 1 is a longitudinal sectional view of a coupling device according to the invention;

FIG. 2 is a detail view in the direction of arrow F of FIG. 1;

FIG. 3 is a perspective view of the sleeve;

FIG. 4 is an end elevational view of the inner surface of the cover, and

FIG. 5 is a sectional view taken on line 5—5 of FIG. 4.

DETAILED DESCRIPTION OF THE INVENTION

FIG. 1 shows the end of a shaft which has an axis X—X and is provided with a fork element of a universal joint. This fork element 1 is connected by a coupling 10 according to the invention to a transmission tube 2.

The coupling proper comprises a cylindrical tubular sleeve 11 which is welded to the fork element 1 and defines three runways 12 for three rollers 13. This sleeve is preferably cut to length from a hot or cold forged tube of steel which is capable of undergoing a surface hardening, for example by dipping, induction, or after cementation so as to be capable of defining the aforementioned runways. These runways have a circular cross-sectional shape and receive rollers of spherical shape and mounted to be rotatable and slidable on three trunnions 14 of a tripod element 15 which radially projects from and is fixed to a rod or shaft 16 rigid with the transmission tube 2.

The spherical shape of the rollers ensures a good distribution of the pressure along the generatrix of contact with the runways. However, they may be cylindrical and roll along planar runways.

Further, it is preferred to arrange that these rollers be mounted on needles 17 which are retained by a cap 18 elastically clipped on the end of each trunnion.

At the end thereof remote from the fork element 1 and facing the transmission tube 2, the sleeve 11 is closed by a cover 20 moulded from a suitable plastics material, such as for example "Nylon". This cover performs several important functions and must therefore be described in detail.

Its general shape corresponds to that of the sleeve 11 (FIG. 4). It has a recess 21 whose inner surface constitutes a bearing surface for the adjacent end 19 of the sleeve. A flexible sealing element 22 is interposed between the inner surface of the recess and the edge of the sleeve. The shape of this recess corresponds to the cross-sectional shape of the sleeve.

The part of the cover disposed radially within the recess includes three projecting portions 23 which extend from a collar 23a and centre the cover relative to the metal sleeve. In order to improve this centering, each of the projecting portions includes two flanges 24 which are respectively adapted to cooperate with the opposed tracks of a runway. These flanges may also serve to maintain the sealing element 22 in position before assembly. Further, each of the projecting portions has a cavity 25 for receiving a part of the adjacent roller in the extreme sliding position.

The cover also defines an opening 26 having an inner cylindrical bearing surface which receives and guides the rod 16 in a sealed manner. In order to improve this seal, the collar 23a is notched or recessed at 27 so as to define a flexible lip 28. Further, the cover defines on the outer surface thereof a cavity 29 for receiving a sealing element 30 and preferably includes reinforcing ribs 31.

The cover 20 is secured to the sleeve 11 by means of an elastically yieldable metal fastener 40 which comprises three branches 41 whose ends engage in stamped cavities 42 provided in the sleeve. This elastically yieldable fastener has an axial opening 43 for the passage of the rod 1 while it retains the sealing element 30. After assembly, it enables the device to resist a tensile force of the order of 2 metric tons.

The operation of this device has no need to be described in detail. Indeed, it will be understood that, upon an axial displacement between the transmission tube 2 and the universal joint of which the fork element 1 is a part, the rod 16 carrying the tripod element and the rollers can travel axially inside the sleeve 11. The limitation of the total extension travel of the device is provided by the abutment of the tripod element (which radially projects from the rod 16) against the collar 23a of the cover.

The device has the following advantages:

as the runways are terminated by a broaching operation, they have a good dimensional precision; as the cover is centered relative to these runways and is maintained firmly in position, the rod 16 is guided by the cover in a precise and reliable manner; this permits, among other advantages, the precise balancing of the transmission rotating at high speeds and consequently the application of the device to the automobile;

the sliding is perfectly free even under high torque;

the axial compactness of the device is the maximum possible bearing in mind the length of the allowed sliding, in particular owing to the special shape of the cover and the optimum use of the entire length of the runways;

the abutment at the end of the extension travel is silent;

this device is of particularly cheap construction owing to the manner in which its components are made: as the sleeve is made from a forged tube cut to length and then broached and hardened, this tube is cut to the dimension corresponding to the length of sliding required for each application; the same tube can therefore be employed irrespective of the contemplated applications; the tripod element, the cover and the fastener are also standard; the cover is a part moulded from a plastics material and it is rapidly and simply mounted; the fastener is a part made from sheet metal folded and hardened and also serves to protect the sealing element 30 and constitutes an abutment at the end of the compression travel of the coupling;

the cover performs several functions: sealing the sleeve; centering relative to the sleeve; abutment for the end of the extension travel for the tripod element; axial guiding of the rod carrying the tripod element; sealing the rod;

the device is very rapidly assembled and requires no special tooling;

it is very light, which is particularly appreciated for reducing the imbalance of a transmission shaft rotating for example at 5000 or 6000 rpm;

it is very reliable and has a particularly long life since it is lubricated throughout its life and the rolling of the rollers on needles results in operation without friction and consequently without wear or heating.

Although the device has been shown in the form of a tripod element, i.e. with three rollers guided in three runways, and this arrangement is considered to be preferable owing to its isostatic character, it will be understood that the device may also be constructed with two rollers or more than three rollers, and the corresponding number of runways.

Having now described my invention what I claim as new and desire to secure by Letters Patent is:

1. A rolling telescopically extensible coupling having an axis on which the coupling is extensible and comprising a tubular sleeve which has a non-circular cross-sectional outer and inner shape and has generatrices parallel to said axis, a rod radially spaced from the sleeve and coaxial with the sleeve on said axis, at least two trunnions rigid with the rod, at least two rollers respectively rotatively mounted on the trunnions, abutment means radially extending from the rod and axially rigid with the rod, said sleeve defining at least two runways receiving said at least two rollers, a cover composed of a plastics material and carried on the sleeve at an end of the sleeve, a fastener which is elastically yieldable as compared to the cover for securing the cover to the sleeve, said fastener having a portion which is located on a side of said cover remote from said sleeve and is in axially supporting relation to the cover and defines an aperture through which aperture said rod extends, means for radially locating the cover relative to the sleeve and centering the cover on said axis, said cover defining a recess in a plane perpendicular to said axis, the shape of said recess being substantially identical to said non-circular cross-sectional shape of the sleeve and said recess abutting against an adjacent end of the sleeve with interposition of a sealing element, said cover being substantially rigid and defining an opening which is in sealing and guiding contact with the rod and said cover acting as an axial abutment for cooperation with said abutment means radially projecting from and rigid with the rod, said rollers engaged in said runways and said opening which is defined by said cover and is in guiding contact with said rod constituting means for maintaining said rod coaxial with said sleeve during operation of said coupling.

2. A coupling according to claim 1, wherein the sleeve is a part of tubular stock which is cut to length.

3. A coupling according to claim 1, wherein the cover comprises projecting portions on an inner surface of the cover which cooperate with the runways of the sleeve and constitute said means for radially locating the cover relative to the sleeve.

4. A coupling according to claim 3, wherein said projecting portions include flanges which cooperate with the runways.

5. A coupling according to claim 3, wherein said projecting portions have hollow portions for receiving the rollers at the end of the extension travel of the coupling.

6. A coupling according to claim 3, wherein the cover includes an annular collar in which collar is provided an annular recess so as to define a sealing lip sealingly engaging the rod.

7. A coupling according to claim 3, wherein the cover defines an axially extending portion acting as an abutment for said abutment means rigid with the rod.

8. A coupling according to claim 3, comprising a cavity in the cover and a sealing element which is disposed in said cavity and is sealingly cooperative with the rod.

9. A coupling according to claim 8, wherein said portion of the fastener defining said aperture through which said rod extends is in retaining relation to the sealing element for the rod.

10. A transmission shaft, in particular for an automobile vehicle, and comprising two rotary transmission elements and a rolling telescopically extensible coupling coupling said two transmission elements, said coupling having an axis on which the coupling is extensible and comprising a tubular sleeve which has a non-circular cross-sectional outer and inner shape and has generatrices parallel to said axis and is fixed to one of said transmission elements to be coupled, a rod fixed to the other of said transmission elements to be coupled and radially spaced from the sleeve and coaxial with the sleeve on said axis, at least two trunnions rigid with the rod, at least two rollers respectively rotatively mounted on the trunnions, abutment means radially extending from the rod and axially rigid with the rod, said sleeve defining at least two runways receiving said at least two rollers, a cover composed of a plastics material and carried on the sleeve at an end of the sleeve opposed to the element to which the sleeve is fixed, a fastener which is elastically yieldable as compared to the cover for securing the cover to the sleeve, said fastener having a portion which is located on a side of said cover remote from said sleeve and is in axially supporting relation to the cover and defines an aperture through which aperture said rod extends, means for radially locating the cover relative to the sleeve and for centering the cover on said axis, said cover defining a recess in a plane perpendicular to said axis, the shape of said recess being substantially identical to said non-circular cross-sectional shape of the sleeve and said recess abutting against an adjacent end of the sleeve with interposition of a sealing element, said cover being substantially rigid and defining an opening which is in sealing and guiding contact with the rod and said cover acting as an axial abutment for cooperation with said abutment means radially projecting from and rigid with the rod, said rollers engaged in said runways and said opening which is defined by said cover and is in guiding contact with said rod constituting means for maintaining said rod coaxial with said sleeve during operation of said coupling.

* * * * *